United States Patent [19]

Featsent

[11] 4,432,129
[45] Feb. 21, 1984

[54] METHOD OF TERMINATING A LIGHT CONDUCTIVE RIBBON

[75] Inventor: Wendell P. Featsent, Hubbard, Ohio

[73] Assignee: General Motors Corporation, Detroit, Mich.

[21] Appl. No.: 342,185

[22] Filed: Jan. 25, 1982

[51] Int. Cl.³ .............................................. B23P 11/02
[52] U.S. Cl. ........................................ 29/447; 29/517; 264/230; 350/96.2; 350/320
[58] Field of Search ................. 29/517, 447; 264/230; 350/96.2, 96.1, 96.23, 320

[56] References Cited

U.S. PATENT DOCUMENTS

| | | | |
|---|---|---|---|
| 3,198,059 | 8/1965 | Phaneuf et al. | 29/447 X |
| 3,203,078 | 8/1965 | Ustin | 29/517 X |
| 3,550,269 | 12/1970 | Yatabe et al. | 29/447 X |
| 3,575,834 | 4/1971 | Hoole et al. | 264/230 X |
| 3,655,275 | 4/1972 | Seagreaves | 29/517 X |
| 3,789,485 | 2/1974 | Gudmestad | 29/517 X |
| 3,912,362 | 10/1975 | Hudson | 350/96.20 |
| 4,127,319 | 11/1978 | Forney, Jr. et al. | 350/96.20 |
| 4,229,402 | 10/1980 | Villarruel et al. | 350/96.20 X |
| 4,336,977 | 6/1982 | Monaghan et al. | 350/96.20 |
| 4,349,497 | 9/1982 | Blackington | 264/230 X |

*Primary Examiner*—Charlie T. Moon
*Attorney, Agent, or Firm*—Warren D. Hill

[57] ABSTRACT

A solid extruded light conductive ribbon of generally rectangular cross section is provided with a tubular ferrule by the steps of placing a section of heat shrink tubing over the end of the ribbon, heating the tubing and ribbon until the shrinking of the tubing deforms the ribbon end into a generally cylindrical form and then applying a cylindrical ferrule over the end of the ribbon and crimping the ferrule in place. The heat shrink tubing thus serves to protect the conductive ribbon during the crimping operation and serves to form the ribbon end into cylindrical form as well.

4 Claims, 8 Drawing Figures

U.S. Patent      Feb. 21, 1984      4,432,129
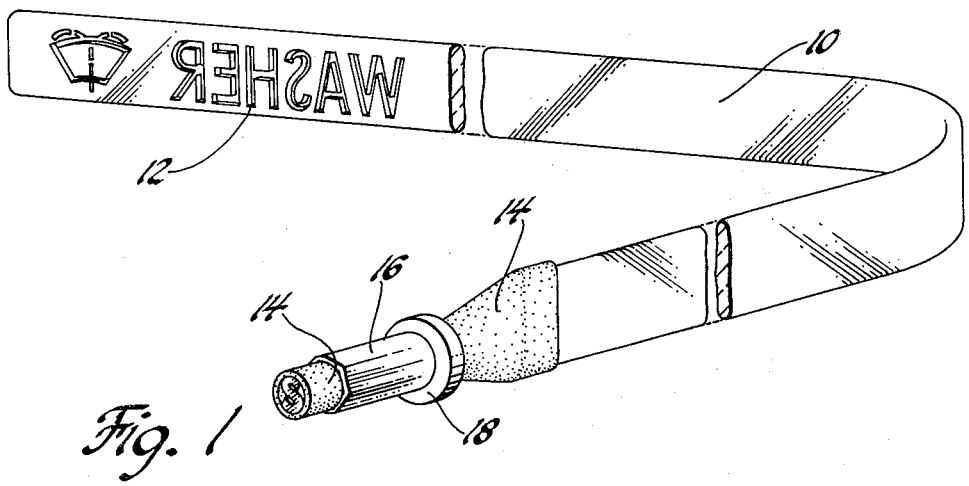
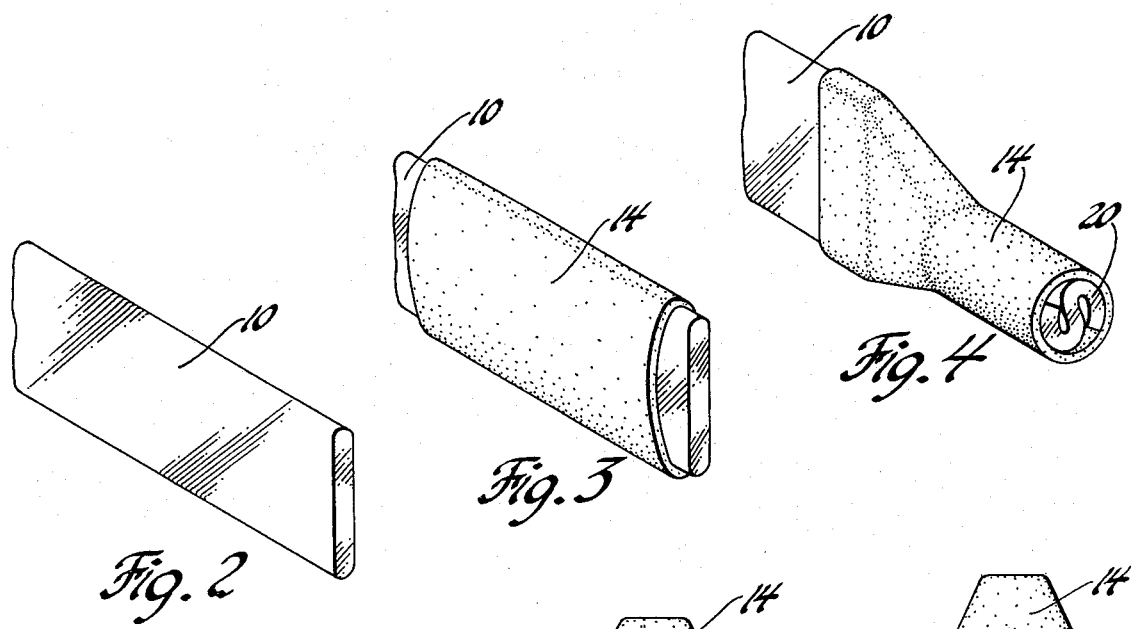
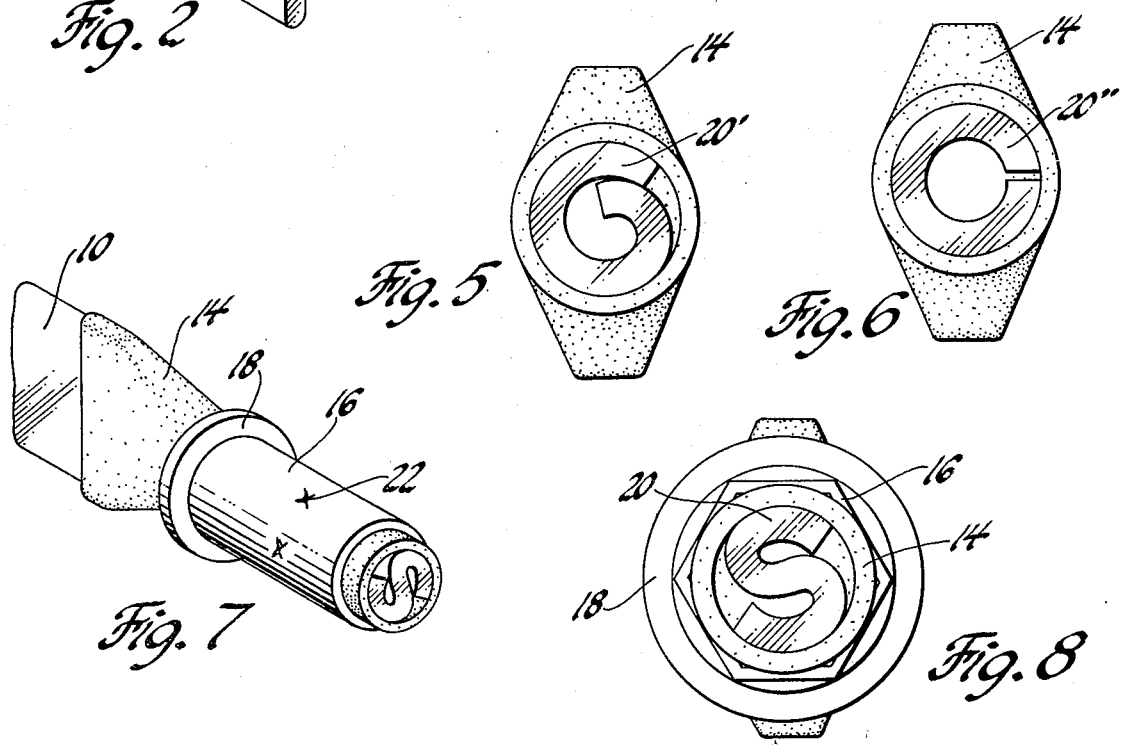

METHOD OF TERMINATING A LIGHT CONDUCTIVE RIBBON

This invention relates to a method of applying a terminal to a solid extruded light conductive ribbon.

It has been the practice with fiber optic light conductors particularly when used for signalling and illumination in automotive vehicles to provide the end of each light conductive cable with a terminal comprising a cylindrical metal ferrule which is conveniently used to insert into a light source or other fixture. This has been true of light conductors in the form of circular cross section bundles of fibers encased by a sheath as well as flat arrays of fibers woven into ribbon form. Another type of light conductor is a solid extruded optical ribbon which has a thin generally rectangular cross section but is relatively stiff so that its general shape is much different than that of the prior conventional fiber optic light conductors and thus is not interchangable in the already developed optical conductor systems. To adapt the extruded ribbon to fixtures of previous design, there is a need for a method to attach conventional terminal hardware, that is, a cylindrical ferrule to the end of a solid extruded optical ribbon. One requirement for such a method is to form the relatively stiff ribbon into a shape which will fit into the cylindrical eyelet and another requirement is to protect the end of the ribbon from damage when the ferrule is crimped onto it.

It is therefore an object of the invention to provide a method of applying cylindrical terminal hardware to solid light conductive ribbon without damage to the mechanical integrity or the optical properties of the ribbon.

The invention is carried out by the method of applying a length of heat shrink tubing over an end of a solid light conductive ribbon of generally rectangular cross section, then heating the ribbon end and tubing to soften the ribbon and to cause shrinkage of the tubing which squeezes the ribbon end into a cylindrical shape, and then applying a ferrule over the cylindrically shaped end of the ribbon and crimping the ferrule in place.

The above and other advantages will be made more apparent from the following specification taken in conjunction with the accompanying drawings wherein like reference numerals refer to like parts and wherein:

FIG. 1 is an isometric view of a solid extruded light conductive ribbon including cylindrical terminal hardware on one end.

FIG. 2 is an isometric view of an end of the ribbon of FIG. 1 prior to the terminal application process of the subject invention.

FIG. 3 is an isometric view of the ribbon of FIG. 2 with a length of heat shrink tubing applied over the ribbon.

FIG. 4 is an isometric view of the ribbon of FIG. 3 after the ribbon and tubing have been heated to constrict the end of the tubing into a cylindrical cross section.

FIGS. 5 and 6 each are end views of a ribbon constrained by the heat shrink tubing into a cylindrical form showing alternative configurations of a deformed ribbon.

FIG. 7 is an isometric view of a ribbon of FIG. 4 with a terminal ferrule applied over the cylindrical end portion of the ribbon, and FIG. 8 is an end view of ribbon terminated according to the method of the invention where the ferrule is secured by a hexagonal crimp.

As is well known, a light conductive element comprises a transparent body or core of a high index of refraction material which is surrounded by a medium of low index of refraction to effect internal reflection of light which has been introduced into the end of the element, thus allowing the light to be transmitted substantial distances along the length of the ribbon to desired exit points. Specifically, the light conductive ribbon discussed herein comprises an extruded rectangular cross section transparent polymethyl methacrylate core covered with a transparent polymer sheath with lower refractive index. The polymer sheath is very thin and for clarity of illustration is not specifically shown in the drawings, it being understood that the ribbon 10 in every instance is suitably coated.

FIG. 1 is a view of a solid extruded light conductive ribbon 10 having a legend 12 inscribed or etched on one side of the ribbon for emitting light from the other side when the end of the ribbon is illuminated. The light input end of the ribbon is covered by a length of heat shrink tubing 14 and by a generally cylindrical metal ferrule 16 which is crimped into place by a hexagonal crimp. As shown in FIG. 2, the ribbon 10 has a thin rectangular cross section which has a width of, say, ¼ inch and a thickness of 0.015 to 0.28 inch.

To form the end of the ribbon 10 into a cylindrical shape adapted to fit a terminal ferrule a length of heat shrink tubing 14 is positioned over the end of the ribbon 10 as shown in FIG. 3. The heat shrink tubing comprises, for example, a polyvinyl chloride or a polyolefin tubing which has been dilated to an enlarged diameter and has the property of shrinking to some terminal size when a predetermined degree of heat is applied thereto. For the 0.015 inch thick ribbon described above, a polyolefin tubing having a diameter of 3/16 inch is applied over the ribbon. Then the end of the ribbon and the end of the tubing 14 are heated to a temperature of about 175°–200° F. The relatively stiff ribbon 10 softens at the elevated temperature and is constricted into a cylindrical envelope as the tubing shrinks. The final size of the tubing after heating is 0.093 inch inner diameter and has a wall thickness of 0.02 inch. As shown in FIGS. 4, 5 and 6 the end of the ribbon 10 becomes curved into an S-shaped section 20, a coil shaped section 20' or a closed C-shape section 20" respectively.

After the end of the ribbon is formed into a cylindrical section, a brass tubular ferrule 16 with a rear flange 18 is applied over the cylindrical end and is then crimped to the end of the ribbon by a plurality of dimples 22 punched into the ferrule around its circumference as shown in FIG. 7 or alternatively by forming the ferrule or some portion of its length into a hexagonal cross-sectional shape as shown in FIG. 8 to tightly grip the cylindrical end 20 of the ribbon 10. Such ferrules and such crimping arrangements are well known in fiber optic terminal assemblies. Thus, the method of this invention benefits by adapting previously developed hardware and crimping methods to the termination of a solid extruded ribbon. If the ferrule were crimped directly to a bare ribbon, the ribbon would be subject to damage. In particular, the transparent polymer sheathing on the ribbon may be ruptured thereby comprising the ribbon's capability of internally reflecting light entering the end of the ribbon. The heat shrink tubing then serves not only as a constrictor to form the ribbon into a cylindrical configuration but also serves as a protective liner to assure that the ribbon is not damaged during the crimping operation. By using a heat shrink tubing material which is transparent and has a low index of refraction, the tubing can effectively replace portions of the polymer sheathing on the ribbon of the sheathing were disrupted either by heat or mechanical stress.

It will thus be seen that the method according to this invention affords a reliable and inexpensive way of terminating solid extruded light conductive ribbons of thin rectangular cross section with cylindrical terminal fittings such as are used with conventional fiber optic elements thereby rendering the ribbon conductors interchangable with the fiber conductors insofar as they can be connected or plugged into the same types of light sources and other accessories.

The embodiments of the invention in which an exclusive property or privilege is claimed are defined as follows:

1. A method of terminating the end of a solid light conductive ribbon comprising the steps of positioning a length of heat shrink tubing over the end of the ribbon, forming the end of the ribbon into a generally cylindrical form by heating the end of the ribbon and the heat shrink tubing to soften the ribbon and to shrink at least an end of the tubing thereby constricting the end of the ribbon into cylindrical form, and then installing a generally cylindrical tubular ferrule over the cylindrically formed ribbon end whereby the heat shrink tubing serves as a protective liner between the ferrule and the ribbon.

2. A method of applying terminal hardware including a ferrule on the end of a solid light conductive ribbon of generally rectangular cross section comprising the steps of positioning a length of heat shrink tubing over the end of the ribbon, forming the end of the ribbon into a generally cylindrical form by heating the end of the ribbon and the heat shrink tubing to soften the ribbon and to shrink at least an end of the tubing thereby constricting the end of the ribbon into a circular cross section, and then placing a generally cylindrical tubular ferrule over the cylindrically formed ribbon end and crimping the ferrule thereon whereby the heat shrink tubing serves as a liner protecting the ribbon when crimping the ferrule.

3. A method of applying a ferrule on the end of a solid light conductive ribbon of transparent polymethyl methacrylate sheathed with a transparent polymer of lower refractive index comprising the steps of positioning a length of heat shrink polymer tubing over the end of the ribbon, forming the end of the ribbon into a generally cylindrical form by heating the end of the ribbon and the heat shrink tubing to soften the ribbon and to shrink at least an end of the tubing thereby constricting the end of the ribbon into cylindrical form, and then installing a generally cylindrical tubular metallic ferrule over the cylindrically formed ribbon end whereby the heat shrink tubing serves as a protective liner between the ferrule and the ribbon.

4. A method of applying a ferrule of the end of a solid light conductive ribbon of a transparent polymethyl methacrylate core covered with a transparent polymer sheath having a refractive index lower than the core comprising the steps of positioning over the end of the ribbon a length of transparent heat shrink tubing having a refractive index lower than that of the core, forming the end of the ribbon into a generally cylindrical form by heating the end of the ribbon and the heat shrink tubing to soften the ribbon and to shrink at least an end of the tubing thereby constricting the end of the ribbon into cylindrical form, and then installing a generally cylindrical tubular ferrule over the cylindrically formed ribbon end whereby the heat shrink tubing serves as a protective liner between the ferrule and the ribbon and further serves as a substitute sheath for the ribbon in the event the transparent polymer is disrupted.

* * * * *